US011534872B2

United States Patent
Katsumata et al.

(12)

(10) Patent No.: US 11,534,872 B2
(45) Date of Patent: Dec. 27, 2022

(54) MIXED COMPOSITION COATING MATERIAL FOR BRAZING

(71) Applicant: MA Aluminum Corporation, Minato-ku (JP)

(72) Inventors: Masaya Katsumata, Susono (JP); Yasunori Hyogo, Izu (JP)

(73) Assignee: MA Aluminum Corporation, Minato-ku (JP)

( * ) Notice: Subject to any disclaimer, the term of this patent is extended or adjusted under 35 U.S.C. 154(b) by 481 days.

(21) Appl. No.: 16/478,606

(22) PCT Filed: Jan. 22, 2018

(86) PCT No.: PCT/JP2018/001787
§ 371 (c)(1),
(2) Date: Jul. 17, 2019

(87) PCT Pub. No.: WO2018/135658
PCT Pub. Date: Jul. 26, 2018

(65) Prior Publication Data
US 2020/0047290 A1    Feb. 13, 2020

(30) Foreign Application Priority Data

Jan. 20, 2017   (JP) .............................. JP2017-008521
Apr. 28, 2017   (JP) .............................. JP2017-090791

(51) Int. Cl.
*B23K 1/00*       (2006.01)
*B23K 35/00*      (2006.01)
(Continued)

(52) U.S. Cl.
CPC ............ *B23K 35/3605* (2013.01); *B23K 1/19* (2013.01); *B23K 35/3607* (2013.01);
(Continued)

(58) Field of Classification Search
CPC .............. B23K 2103/10; B23K 35/286; B23K 2101/14; B23K 35/025; B23K 35/3605;
(Continued)

(56) References Cited

U.S. PATENT DOCUMENTS 3,951,328 A * 4/1976 Wallace ............... B23K 35/286
                                                   228/207
5,100,048 A    3/1992 Timsit
(Continued)

FOREIGN PATENT DOCUMENTS

CN            1211484 A       3/1999
CN          102712064 A      10/2012
(Continued)

OTHER PUBLICATIONS

Combined Chinese Office Action and Search Report dated May 13, 2020 in corresponding Chinese Patent Application No. 201880004445.3 (with English Translation), 16 pages.
(Continued)

*Primary Examiner* — Erin B Saad
(74) *Attorney, Agent, or Firm* — Oblon, McClelland, Maier & Neustadt, L.L.P.

(57) ABSTRACT

In a mixed composition coating material for brazing, when a total mass of a solid material, an organic solvent, and water is defined as 100 mass %, the solid material are contained in an amount of 30 mass % or greater and 80 mass % or less with respect to the whole coating material, the organic solvent and the water is contained in a total amount of 20 mass % or greater and 70 mass % or less with respect to the whole coating material, and the water is contained in an amount of 0.4 mass % or greater and 2.5 mass % or less with respect to the whole coating material.

8 Claims, 3 Drawing Sheets

(51) Int. Cl.
*B23K 35/36* (2006.01)
*B23K 1/19* (2006.01)
*F28F 21/08* (2006.01)
*B23K 101/14* (2006.01)
*B23K 35/22* (2006.01)

(52) U.S. Cl.
CPC ........ *B23K 35/3613* (2013.01); *F28F 21/084* (2013.01); *B23K 35/226* (2013.01); *B23K 2101/14* (2018.08)

(58) Field of Classification Search
CPC ......................... B23K 35/3613; B23K 35/362; B23K 1/0012; B23K 1/0016; B23K 1/20; B23K 1/203; B23K 20/00; B23K 20/02; B23K 20/16; B23K 20/2336; B23K 35/002; B23K 35/0222; B23K 35/0227; B23K 35/0244; B23K 35/22; B23K 35/26; B23K 35/282; B23K 35/36; B23K 35/3602; B23K 35/3606; B23K 35/361; B23K 35/3611; B23K 35/3612; B23K 35/3618
See application file for complete search history.

(56) References Cited

U.S. PATENT DOCUMENTS

| | | | | |
|---|---|---|---|---|
| 10,329,447 | B2 * | 6/2019 | Treichel | C09D 133/08 |
| 10,556,292 | B2 * | 2/2020 | Nanbu | B23K 20/00 |
| 2006/0243778 | A1 | 11/2006 | Yamaguchi et al. | |
| 2009/0165893 | A1 * | 7/2009 | Akazawa | B23K 35/22 |
| | | | | 148/24 |
| 2016/0052092 | A1 * | 2/2016 | Ota | C08G 18/44 |
| | | | | 148/24 |

FOREIGN PATENT DOCUMENTS

| | | |
|---|---|---|
| CN | 103889647 A | 6/2014 |
| CN | 105149597 A | 12/2015 |
| JP | 5-337689 A | 12/1993 |
| JP | 7-185796 A | 7/1995 |
| JP | 8-118065 A | 5/1996 |
| JP | 11-239867 A | 9/1999 |
| JP | 2005-125379 A | 5/2005 |
| JP | 2009-142870 A | 7/2009 |
| JP | 2009-269043 A | 11/2009 |
| JP | 2011-131247 A | 7/2011 |
| JP | 2011-137203 A | 7/2011 |
| JP | 2012-24788 A | 2/2012 |
| JP | 2012-163317 A | 8/2012 |

OTHER PUBLICATIONS

International Search Report dated Apr. 24, 2018 in PCT/JP2018/001787 filed on Jan. 22, 2018.
Notice of Allowance dated Dec. 18, 2018 in Japanese Patent Application No. 2018-024438 (with English translation), total 6 pages.
Combined Chinese Office Action and Search Report dated Jan. 20, 2021 in Chinese Patent Application No. 201880004445.3 (with English translation), 20 pages.
Extended European Search Report dated Sep. 14, 2020 in European Patent Application No. 18742078.1, 8 pages.

* cited by examiner

MIXED COMPOSITION COATING MATERIAL FOR BRAZING

TECHNICAL FIELD

The present invention relates to a mixed composition coating material for brazing.

Priority is claimed on Japanese Patent Application No. 2017-8521, filed on Jan. 20, 2017, and Japanese Patent Application No. 2017-90791, filed on Apr. 28, 2017, the contents of which are incorporated herein by reference.

BACKGROUND ART

In the past, copper tubes have been used as heat transfer tubes for a heat exchanger for air conditioning. However, from the viewpoint of resource depletion and cost reduction, changing to aluminum alloy heat transfer tubes has been considered, and thus a method in which a flat tube subjected to brazing is used as in a heat exchanger for an automobile has been considered.

While heat exchangers for an automobile perform heat exchange using traveling wind, heat exchangers for air conditioning perform heat exchange using fan blowing. Accordingly, in a case where dew condensation water accumulates between fins, pressure loss increases, and this leads to a reduction in heat exchange performance. For this reason, the heat exchangers for air conditioning have a structure using fins communicating with flat tubes in a stage direction.

As an example of the heat exchangers for air conditioning using a flat tube, a heat exchanger has been known having a configuration in which a plurality of aluminum alloy flat tubes arranged in a vertical direction at regular intervals are provided between a first header collecting tube and a second header collecting tube disposed on the left and right sides, respectively, and corrugated fins meandering in the vertical direction are provided between the upper and lower flat tubes as described in PTL 1.

In the heat exchanger described in PTL 1, a heat transfer portion of the fin is disposed between the flat tubes arranged in the vertical direction, a ventilation passage is provided between the flat tubes, and heat exchange is performed between the air flowing through the ventilation passage and the fluid flowing in the flat tube.

PTL 2 describes a flat tube for a heat exchanger in which a surface of an extruded porous flat tube made of an aluminum alloy is coated with a flux composition containing a synthetic resin containing a polymer or copolymer of methacrylic acid ester as a main component, a flux for brazing, and an organic solvent in order to suppress retention of dew condensation water.

CITATION LIST

Patent Literature

[PTL 1] Japanese Unexamined Patent Application, First Publication No. 2012-163317
[PTL 2] Japanese Unexamined Patent Application, First Publication No. H11-239867

SUMMARY OF INVENTION

Technical Problem

A method of applying a flux or a mixed composition of a flux and a brazing material to a surface of a material to be brazed has been performed to assemble a heat exchanger having a structure in which fins and a plurality of flat tubes are formed integrally with each other, and a coating material composition for brazing having an improved component composition suitable for brazing has been proposed.

The coating material composition for brazing is generally a mixed coating material composition of a brazing material, a flux, a synthetic resin, and an organic solvent. The mixed coating material composition is applied to a flat tube to be joined to a fin, the fin and the flat tube are assembled, and then the whole assembly is heated to a brazing temperature to perform brazing.

Since coating material compositions for brazing which have been known had an unstable viscosity, it was difficult to uniformly apply the composition to a surface of a flat tube. For example, the viscosity of the coating material composition of this kind significantly changed in some cases during coating with the composition. In a case where the coating material composition for brazing has an unstable viscosity, the uniformity of the brazing material and the flux in the coating material composition is reduced, and thus there is a concern that a brazing failure portion may be generated.

In addition, a sacrificial anode layer is required to be provided to improve corrosion resistance in the heat exchanger. The sacrificial anode layer is required to be completely corroded to suppress the occurrence of pitting corrosion in the flat tube. It is preferable that a uniform sacrificial anode layer is widely formed around a brazing portion of the flat tube by diffusing Zn from the flux mainly containing Zn to the aluminum alloy side. However, in a case where the coating material composition for brazing has an unstable viscosity as described above, the diffusion state of Zn is likely to be uneven, and corrosion resistance of the heat exchanger is reduced.

The invention is contrived in view of the circumstances, and an object thereof is to provide a mixed composition coating material for brazing which can be uniformly applied by increasing viscosity stability and has good corrosion resistance after brazing to secure good brazability without brazing unevenness.

Solution to Problem

From the above-described background, the inventors have studied a viscosity change of a conventional coating material composition for brazing containing a solid material and an organic solvent, and found that the organic solvent used as a dispersion medium for the coating material composition of this kind has hygroscopicity, and the viscosity of the coating material composition continues to change as the organic solvent takes in the moisture in the air. Based on the findings, the inventors have further studied the coating material composition, and confirmed that it is possible to suppress the viscosity change during coating by previously mixing an appropriate amount of moisture with the coating material composition for brazing.

In a mixed composition coating material for brazing according to the invention, when a total mass of a solid material, an organic solvent, and water is defined as 100 mass %, the solid material are contained in an amount of 30 mass % or greater and 80 mass % or less with respect to the whole coating material, the organic solvent and the water is contained in a total amount of 20 mass % or greater and 70 mass % or less with respect to the whole coating material, and the water is contained in an amount of 0.4 mass % or greater and 2.5 mass % or less with respect to the whole coating material.

In the mixed composition coating material for brazing according to the invention, an SP value of the organic solvent is preferably 9.4 or greater and 14 or less.

In the mixed composition coating material for brazing according to the invention, the solid material preferably consist of, among a brazing material, a flux, and a synthetic resin, the flux and the synthetic resin, or the brazing material, the flux, and the synthetic resin.

In the mixed composition coating material for brazing according to the invention, the flux is preferably a fluoride-based flux.

In the mixed composition coating material for brazing according to the invention, the fluoride-based flux preferably consists of one or more of $KZnF_3$, $ZnF_2$, LiF, KF, $CaF_2$, $AlF_3$, $K_2SiF_6$, $KAlF_4$, $K_3AlF_6$, and $K_2AlF_5 \cdot 5H_2O$.

In the mixed composition coating material for brazing according to the invention, the flux may be a Zn-containing fluoride-based flux.

In the mixed composition coating material for brazing according to the invention, the flux may be a Zn-free fluoride-based flux.

In the mixed composition coating material for brazing according to the invention, the flux may be a mixed flux of a Zn-containing fluoride-based flux and a Zn-free fluoride-based flux.

In a case where the mixed composition coating material for brazing according to the invention contains the brazing material, the brazing material preferably contains a Si powder or a Si-containing alloy powder.

In the mixed composition coating material for brazing according to the invention, the synthetic resin preferably consists of one or more of an acrylic resin, a resin having a polyether skeleton, and a cellulose-based resin.

Advantageous Effects of Invention

A mixed composition coating material for brazing according to the invention contains an appropriate amount of water in addition to a solid material and an organic solvent, and is excellent in viscosity stability after production. Accordingly, it is possible to provide a mixed composition coating material for brazing which hardly changes in viscosity even when being used for a long period of time, and thus can be uniformly applied.

Since the mixed composition coating material for brazing can be uniformly applied, components such as a brazing material, a flux, a synthetic resin, and an organic solvent contained in the formed coating film can be made uniform. Accordingly, in a case where the mixed composition coating material for brazing is used for brazing between an aluminum alloy tube and a fin, a uniform fillet can be formed in the joining portion between the tube and the fin, and high-quality brazing can be performed.

In a case where an organic solvent having an SP value of 9.4 or greater and 14 or less is used, a coating material having a good viscosity for coating can be obtained, and coating unevenness can be eliminated. Therefore, it is possible to provide a coating material for brazing in which corrosion resistance and good brazability can be secured.

In a case where a Zn-containing flux is used and the mixed composition coating material for brazing is applied to an aluminum alloy tube, Zn can be made present uniformly on an outer surface of the tube. Zn is uniformly diffused on the aluminum alloy by heat during brazing, and thus it is possible to form a sacrificial anode layer in which Zn is uniformly diffused on the outer surface of the tube. For this reason, in a case where the mixed composition coating material for brazing according to the invention is used, it is possible to provide a brazing structure having excellent corrosion resistance.

DESCRIPTION OF EMBODIMENTS

Hereinafter, the invention will be described in detail based on the embodiments shown in the accompanying drawings.

Figure 1:
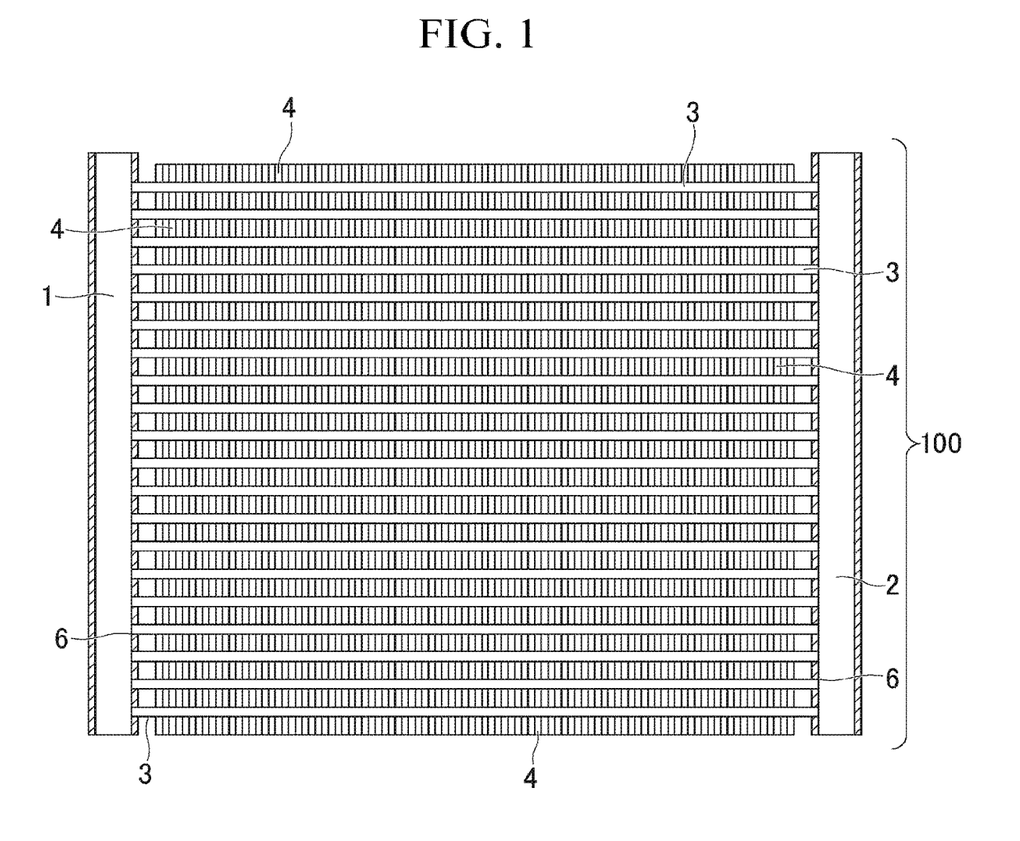
FIG. 1 is a front view showing an example of a heat exchanger manufactured by applying a mixed composition coating material for brazing according to the invention.

FIG. 1 shows an example of a heat exchanger according to the invention. A heat exchanger 100 mainly includes header pipes 1 and 2 which are separated from each other in parallel on the left and right sides, a plurality of tubes 3, each of which is formed of a MPE (Multi Port Extrusion) tube, which are in parallel to each other at intervals between the header pipes 1 and 2 and joined to the header pipes 1 and 2 at right angles, and corrugated fins 4 which are attached to the tubes 3. The header pipes 1 and 2, the tubes 3, and the fins 4 are made of an aluminum alloy to be described later.

More specifically, a plurality of slits 6 are formed at regular intervals on facing side surfaces of the header pipes 1 and 2 in a length direction of each pipe, and end portions of the tube 3 are inserted into the facing slits 6 of the header pipes 1 and 2 to install the tube 3 between the header pipes 1 and 2. In addition, the fins 4 are disposed between the plurality of tubes 3 installed at predetermined intervals between the header pipes 1 and 2, and these fins 4 are brazed to the front surface side or the back surface side of the tubes 3.

Figure 2:
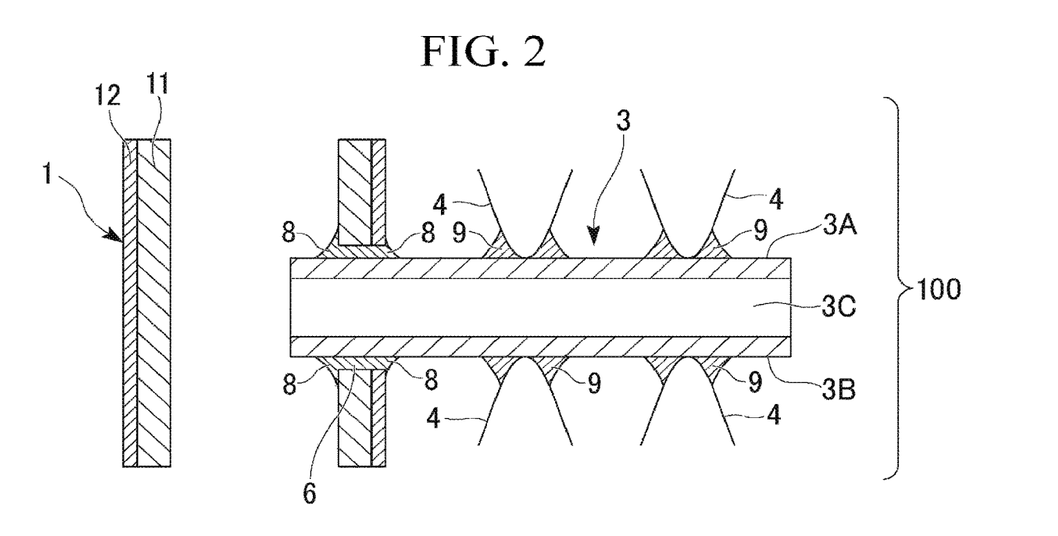
FIG. 2 is a partial enlarged cross-sectional view showing a state in which a header pipe, a tube, and fins are assembled and subjected to brazing in the heat exchanger.

That is, as shown in the cross-section of FIG. 2, a fillet 8 is formed with a brazing material at a portion where an end portion of the tube 3 is inserted into the slit 6 of the header pipe 1 or 2, and the tube 3 is brazed to the header pipe 1 or 2. In addition, a fillet 9 is formed with a brazing material formed at a portion between a peak of the wave in the corrugated fin 4 and a front surface or a back surface of the adjacent tube 3 facing each other, and the corrugated fin 4 is brazed to the front surface side or the back surface side of the tube 3.

Figure 3:
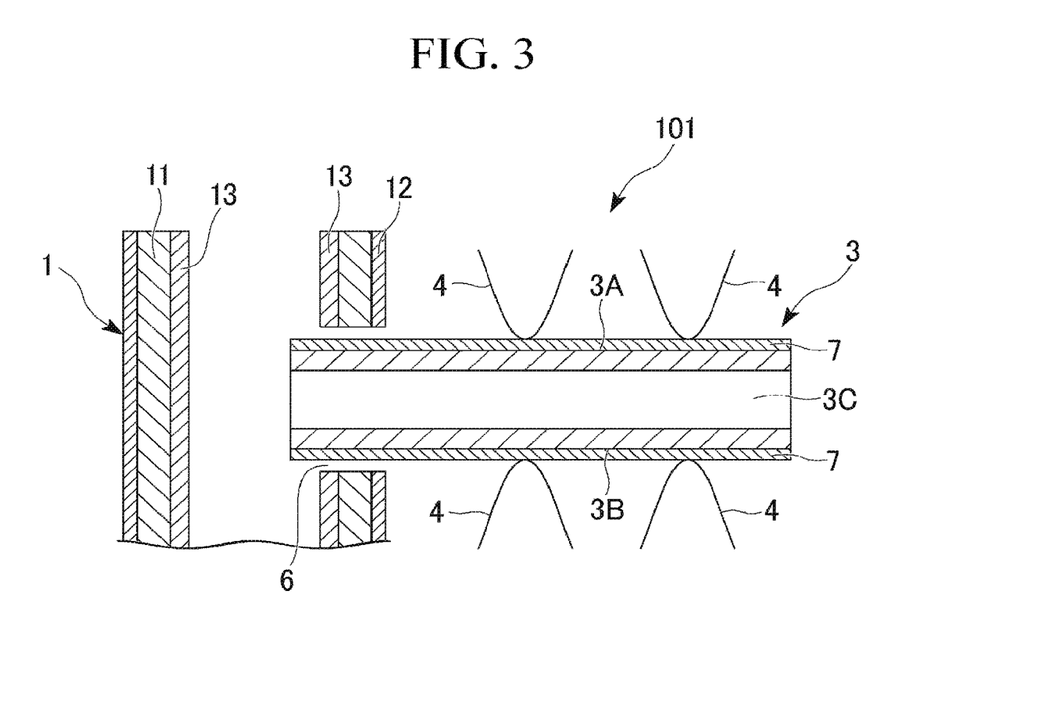
FIG. 3 is a partial enlarged cross-sectional view showing a state in which the header pipe, the tube coated with the mixed composition coating material for brazing, and the fins are assembled before brazing in the heat exchanger.

To manufacture the heat exchanger 100 according to this embodiment, a heat exchanger assembly 101 is formed as shown in FIG. 3 by assembling the header pipes 1 and 2 and the plurality of tubes 3 and the plurality of fins 4 installed between the header pipes, and the assembly is heated for brazing as will be described in detail in a manufacturing method to be described later.

Figure 4:
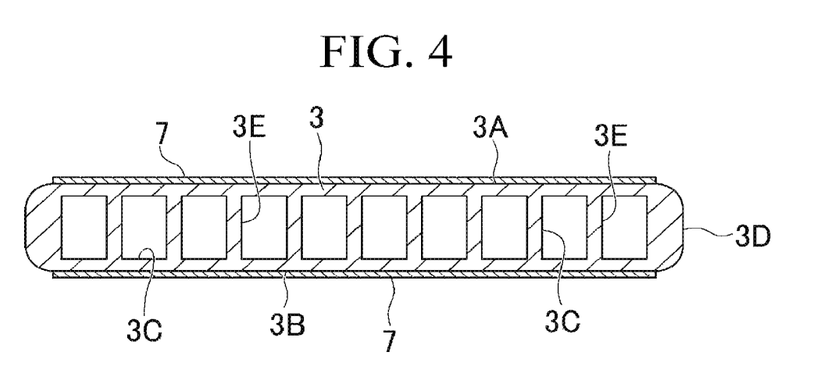
FIG. 4 is a cross-sectional view showing an example of the tube coated with the mixed composition coating material for brazing.

As shown in FIGS. 3 and 4, the tube 3 before brazing has a brazing coating film 7 which is formed by coating a front surface and a back surface, to which the fins 4 are joined, with a brazing mixed composition coating material containing at least a brazing material powder, a flux, a synthetic resin, an organic solvent, and water, and by drying the coating material.

The tube 3 is formed of an extruded MPE tube which is made of an aluminum alloy, has a plurality of passages 3C formed therein as shown in the cross-sectional structure of FIG. 4, and is provided with a flat front surface (upper surface) 3A, a flat back surface (lower surface) 3B, and side surfaces 3D adjacent to the front surface 3A and the back surface 3B. Although 10 passages 3C are formed in the tube 3 by partition by partition walls 3E in the example shown in FIG. 4, the number of the passages 3C formed is optional. In general, several to several tens of passages are formed.

In a general heat exchanger, the tube 3 has a height (total thickness) of about 1 mm to several mm and a width of about several tens of mm, and the thickness of the wall portion defining the passages 3C is about 0.1 to 1.5 mm. In this specification, in a case where the upper limit and the lower limit of a numerical value range are expressed using numerical values and "to", the numerical value range includes the upper limit and the lower limit unless otherwise noted. Therefore, the expression 0.1 to 1.5 mm means 0.1 mm or greater and 1.5 mm or less.

In the mixed composition coating material for brazing for forming the brazing coating film 7, when a total mass of a solid material, an organic solvent, and water is defined as 100 mass %, the solid material are contained in an amount of 30 mass % or greater and 80 mass % or less with respect to the whole coating material, the organic solvent and the water is contained in a total amount of 20 mass % or greater and 70 mass % or less with respect to the whole coating material, and the water is contained in an amount of 0.4 mass % or greater and 2.5 mass % or less with respect to the whole coating material.

The solid material contained in the mixed composition coating material for brazing may include, for example, a brazing material, a flux, and a synthetic resin. The solid material may include a flux and a synthetic resin.

An SP value of the organic solvent is preferably 9.4 or greater and 14 or less, and the ratio of the water is 0.4 mass % or greater and 2.5 mass % or less with respect to the whole coating material.

Hereinafter, the constituent elements of the mixed composition coating material for brazing will be individually described.

The solid material contained in the mixed composition coating material for brazing represents a brazing material such as a brazing powder, a flux, and a synthetic resin.

<1.5 to 73 Mass % of Brazing Material in Coating Material>

The brazing material content of the mixed composition coating material for brazing is preferably in a range of 1.5 to 73 mass %.

In a case where the brazing material content is less than 1.5 mass %, the amount of the brazing material required for the brazing coating film 7 cannot be secured, and brazability is reduced.

In a case where the brazing material content is greater than 73 mass %, the brazing coating film 7 contains an excess amount of the brazing material, and thus Zn is easy to be concentrated in the fillet due to excessive formation of the brazing filler metal. In a case where a Si powder is used as the brazing material, unreacted Si residues are generated, and a corrosion depth of the tube increases. Accordingly, the fin separation prevention effect cannot be obtained.

<Brazing Powder>

A brazing powder formed of a Si powder, an Al—Si powder, or the like is melted and turns into a brazing liquid in brazing, and forms a brazing filler metal which joins the fins 4 and the tubes 3. Zn in the flux diffuses in the brazing liquid, and uniformly spreads on the surface of the tube 3. Since the diffusion rate of Zn in the liquid-phase brazing liquid is extremely higher than that in the solid phase, the Zn concentration of the surface of the tube 3 becomes almost uniform. Thus, a uniform Zn diffusion layer is formed, and corrosion resistance of the tube 3 can be improved.

[Amount of Brazing Powder Applied: 1 to 30 g/m$^2$]

The amount of the brazing powder (brazing material) applied is preferably in a range of 1 to 30 g/m$^2$. In a case where the amount of the brazing powder applied is too small, brazability may be reduced. In a case where the amount of the brazing powder applied is too large, Zn is easy to be concentrated in the fillet due to excessive formation of a brazing filler metal, the fillet preferentially corrodes, and the fin separation prevention effect cannot be obtained. Therefore, the brazing powder content of the coating film is preferably 1 to 30 g/m$^2$.

<Zn-Containing Flux and Zn-Free Flux>

A Zn-containing flux forms a Zn diffusion layer on the surface of the tube 3 in brazing, and has a pitting corrosion resistance improving effect. In addition, the Zn-containing flux acts to break an oxide film of an outer surface of the tube 3 in brazing to promote the spread and wetting of the brazing material, thereby improving brazability. Since the Zn-containing flux has higher activity than a Zn-free flux, good brazability can be obtained even using a relatively fine Si powder. As the Zn-containing flux, any one or both of $KZnF_3$ and $ZnF_3$ are preferably used.

As the Zn-free flux, a fluoride-based flux or a potassium fluoroaluminate-based flux is a flux containing $KAlF_4$ as a main component, and various compositions with the addition of additives are known. Examples thereof include a flux having a composition of $K_3AlF_6+KAlF_4$ and $Cs_{(x)}K_{(y)}F_{(z)}$. A fluoride-based flux (for example, a potassium fluoroaluminate-based flux) containing a fluoride added thereto, such as LiF, KF, $CaF_2$, $AlF_3$, or $K_2SiF_6$, can also be used. The addition of a fluoride-based flux (for example, a potassium fluoroaluminate-based flux) in addition to the Zn flux contributes to the improvement of brazability.

<Flux Content of 2.5 to 74 Mass % in Coating Material>

The flux content of the mixed composition coating material for brazing is preferably in a range of 2.5 to 74 mass %.

In a case where the flux content is less than 2.5 mass %, the formation of a brazing filler metal is not sufficient, and thus the removal of a surface oxide film of a material to be brazed (tube 3) by breaking is not sufficient. Accordingly, brazing failure is caused. In a case where the flux content is greater than 74 mass %, the coating film has a large thickness, and thus a gap between the fin and the tube is large in brazing. Accordingly, joining failure occurs.

[Amount of Flux Applied: 3 to 20 g/m$^2$]

In a case where the amount of the flux applied is less than 3 g/m$^2$ in the coating film, the formation of a brazing filler metal is not sufficient, and thus the removal of a surface oxide film of a material to be brazed (tube 3) by breaking is not sufficient. Accordingly, brazing failure is caused. In a case where the amount of the flux applied is greater than 20 g/m$^2$, the coating film has a large thickness, and thus a gap between the fin and the tube is large in brazing. Accordingly, joining failure occurs. Therefore, the amount of the flux applied is adjusted to 3 to 20 g/m$^2$.

As the flux, a mixed flux obtained by mixing one or more of fluoride-based fluxes such as LiF, KF, CaF$_2$, AlF$_3$, K$_2$SiF$_6$, KAlF$_4$, K$_3$AlF$_6$, K$_2$AlF$_5$.5H$_2$O, KZnF$_3$, and ZnF$_3$ may be used as necessary.

<Synthetic Resin: Binder>

The mixed composition coating material for brazing contains a synthetic resin as a binder, in addition to the brazing powder and the flux. Examples of the synthetic resin as a binder include acrylic resins, resins having a polyether skeleton, and cellulose-based resins.

<Synthetic Resin Content of 4.5 to 14.5 Mass % in Coating Material>

The synthetic resin content (binder content) of the mixed composition coating material for brazing is preferably in a range of 4.5 to 14.5 mass %.

In a case where the binder content of the mixed composition coating material for brazing is less than 4.5 mass %, coating film hardness is reduced, and processability (coating peeling resistance) is reduced. In a case where the binder content is greater than 14.5 mass %, there is a concern that brazability may be reduced since no fillet is formed due to the unreacted coating film.

[Amount of Synthetic Resin (Binder) Applied: 0.2 to 8.3 g/m$^2$]

In a case where the amount of the binder applied in the brazing coating film 7 is less than 0.2 g/m$^2$, coating film hardness is reduced, and processability (coating peeling resistance) is reduced. In a case where the amount of the binder applied is greater than 8.3 g/m$^2$, brazability is reduced since no fillet is formed due to the unreacted coating film. Therefore, the amount of the binder applied is preferably 0.2 to 8.3 g/m$^2$. The binder usually evaporates by heating in brazing.

<Organic Solvent>

One or more of isopropyl alcohol (IPA), 3-methoxy-3-methyl-1-butanol (MMB), a formic acid, dibutyl phthalate (DBP), ethyl acetate, and phenol can be used as an organic solvent contained in the mixed composition coating material for brazing.

The organic solvent content is preferably in a range of 20 to 70 mass %.

In a case where the organic solvent content is less than 20 mass %, the coating material has a too high viscosity. Thus, the coating material lacks spreadability, and brazability is reduced due to non-uniformity of the flux and the brazing material. In a case where the organic solvent content is greater than 70 mass %, the coating material has a too low viscosity, and this leads to excessive spreadability of the coating material. Accordingly, corrosion resistance and brazability are reduced due to non-uniformity of the flux and the brazing material.

An SP value of the organic solvent contained in the mixed composition coating film for brazing is required to be 9.4 or greater and 14 or less as described above in the description of the coating material.

The SP value (solubility parameter) of the organic solvent is a value serving as a parameter of solubility, and has an influence on the viscosity and the solubility to water to be added to the coating material. The value of the organic solvent is preferably 9.4 or greater and 14 or less. In a case where the SP value is less than 9.4, the coating material has a too high viscosity, and thus coating unevenness easily occurs. Accordingly, there is a concern that corrosion resistance and brazability may be reduced due to the coating unevenness due to large-amount dilution.

In a case where the SP value is greater than 14, the polarity increases, and thus brazability is reduced due to a reduction in the thermal degradability.

<Water>

The mixed composition coating material for brazing contains, in addition to the solid material such as a brazing powder, a flux, and a binder and the organic solvent, 0.4 mass % to 2.5 mass % of water with respect to the whole mixed composition coating material for brazing.

By adding water to the above-described mixed composition coating material for brazing, it is possible to suppress taking in new moisture during coating, and thus it is possible to prevent a change in viscosity of the coating material. In a case where the amount of water contained in the mixed composition coating material for brazing is less than 0.4 mass %, the coating material lacks viscosity stability, and thus there is a concern that problems may occur in corrosion resistance and brazability due to non-uniformity of the flux and the brazing material.

In a case where the amount of water contained in the mixed composition coating material for brazing is greater than 2.5 mass %, brazability is reduced due to separation of the synthetic resin.

The tube 3 is preferably formed of an aluminum alloy containing, by mass %, Si: 0.05% to 1.0% and Mn: 0.1% to 1.5% with the balance aluminum and inevitable impurities. The tube 3 is produced by extruding the aluminum alloy.

Hereinafter, the reasons for limitation of the respective constituent elements of the aluminum alloy forming the tube 3 will be described.

<Si: 0.05% to 1.0%>

Si is an element having a strength improving effect like Mn.

In a case where the Si content is less than 0.05%, the strength improving effect is not sufficient. In a case where Si is contained in an amount exceeding 1.0%, extrudability is reduced. Therefore, in the invention, the Si content of the tube 3 is preferably set to 0.05% to 1.0%.

<Mn: 0.1% to 1.5%>

Mn is an element that improves the corrosion resistance of the tube 3 and the mechanical strength. In addition, Mn is effective in improving extrudability in extrusion molding. Furthermore, Mn is effective in suppressing the fluidity of a brazing filler metal and reducing a difference in the Zn concentration between the fillet and the tube surface.

In a case where the Mn content is less than 0.1%, the corrosion resistance improving effect and the strength improving effect are not sufficient. In addition, the fluidity suppression effect for the brazing filler metal is also reduced. In a case where the Mn content is greater than 1.5%, extrudability is reduced due to an increase in the extrusion pressure. Therefore, in the invention, the Mn content is preferably 0.1% to 1.5%.

Next, the fins 4 will be described.

The fin 4 joined to the tube 3 is preferably formed of an aluminum alloy containing, by mass %, Zn: 0.3% to 5.0%, Mn: 0.5% to 2.0%, Fe: 1.0% or less, and Si: 1.5% or less with the balance aluminum and inevitable impurities.

To obtain the fin 4, an aluminum alloy having the above composition is melted in the usual manner and processed into a corrugated shape through a hot rolling step, a cold rolling step, and the like. The method of manufacturing the fin 4 is not particularly limited in the invention, and a known manufacturing method can be appropriately employed.

Hereinafter, the reasons for limitation of the respective constituent elements of the aluminum alloy forming the fin 4 will be described.

<Zn: 0.3% to 5.0%>

In a case where the fin 4 contains Zn, the potential of the fin 4 can be lowered, and thus a sacrificial anti-corrosive effect can be imparted to the fin 4.

The Zn content of the fin 4 is required to be 0.3% or greater and 5.0% or less by mass %. In a case where the Zn content of the fin 4 is less than 0.3%, the sacrificial anti-corrosive effect is reduced, and in a case where the Zn content is greater than 5.0%, self-corrosion resistance tends to be reduced.

<Mn: 0.5% to 2.0%>

Mn improves the strength of the fin 4, and also improves the corrosion resistance.

In a case where the Mn content is less than 0.5%, the high temperature and room temperature strength improving effect is not sufficient, and in a case where the Mn content is greater than 2.0%, processability is not sufficient in producing the fin 4. Therefore, the Mn content of the alloy forming the fin is 0.5% to 2.0%.

<Si: 1.5% or Less>

In a case where Si is contained, it forms a compound with Mn, and a strength improving effect can be exhibited.

<Fe: 1.0% or Less>

Fe improves the strength. However, in a case where the Fe content is greater than 1.0%, the self-corrosion ratio of the fin 4 increases, and thus corrosion resistance is reduced.

In the invention, the method of applying the mixed composition coating material for brazing containing a Si-containing brazing powder, a flux, a binder, an organic solvent, and water is not particularly limited, and can be performed by an appropriate method such as a spray method, a shower method, a flow-coater method, a roll-coater method, a brush-coating method, a dipping method, or an electrostatic coating method. The whole surface of the tube 3 may be coated with the mixed composition coating material for brazing. Otherwise, a part of the front surface or the back surface of the tube 3 may be coated with the mixed composition coating material for brazing. In short, the coating material may be applied to the surface region of the tube 3 necessary for brazing at least the fins 4 and the header pipe 2.

The above-described mixed composition coating material for brazing contains an appropriate amount of water, and has less change in viscosity even being used for a long period of time. For this reason, even in a case where the mixed composition coating material for brazing is applied after used for a predetermined period of time, the coating conditions can be set with the same viscosity as immediately after the preparation of the coating material, and coating can be performed under the same viscosity conditions.

In a case where the viscosity of the coating material significantly changes as compared to that at the time of manufacturing, the coating conditions are required to be re-examined regardless of any coating method such as the spray method, the shower method, the flow-coater method, the roll-coater method, the brush-coating method, the dipping method, or the electrostatic coating method described above. However, in the above-described mixed composition coating material for brazing, the viscosity can be maintained for a long period of time, which does not significantly change as compared to that immediately after manufacturing. Accordingly, a uniform coating film can be formed on the tube 3 even in a case where the mixed composition coating material for brazing is applied after a period of time after manufacturing.

Next, the method of manufacturing the heat exchanger 100 which has, as main constituent elements, the header pipes 1 and 2, the tubes 3, and the fins 4 described above will be described.

FIG. 3 is a partial enlarged view of a heat exchanger assembly 101 in which the header pipes 1 and 2, the tubes 3 and the fins 4 are assembled using the tubes 3 of which the surface joined to the fins 4 is coated with the brazing coating film 7, and shows a state before heating brazing. In the heat exchanger assembly 101 shown in FIG. 3, one end of the tube 3 is inserted into and attached to a slit 6 provided in the header pipe 1.

In a case where the heat exchanger assembly 101 including the header pipes 1 and 2, the tubes 3, and the fins 4 assembled as shown in FIG. 3 is heated to a temperature that is equal to higher than a melting point of the brazing material in a heating furnace or the like in an inert gas atmosphere, and then cooled after the heating, a brazing material layer 13 and the brazing coating film 7 are melted, and the header pipe 1 and the tube 3, and the tube 3 and the fin 4 are respectively joined as shown in FIG. 2. Accordingly, a heat exchanger 100 having a structure shown in FIGS. 1 and 2 is obtained. In this case, the brazing material layer 13 on the inner peripheral surface of the header pipe 1 is melted and flows near the slit 6 to form a fillet 8, and thus the header pipe 1 and the tube 3 are joined. In addition, the brazing coating film 7 on the surface of the tube 3 is melted and becomes an Al—Zn brazing filler metal, Al—Si brazing filler metal, or Al—Si—Zn brazing filler metal. It flows near the fin 4 by a capillary force to form a fillet 9, and thus the tube 3 and the fin 4 are joined. The reference sign 11 denotes a core material of the header pipe 1, and the reference sign 12 denotes a Zn-containing coating layer for forming a sacrificial anode layer in the header pipes 1 and 2.

In brazing, the brazing coating film 7 and the brazing material layer 13 are melted by heating to a suitable temperature in an appropriate atmosphere such as an inert gas atmosphere. Then, the activity of the flux increases, and Zn in the flux precipitates on the surface of a material to be brazed (tube 3), diffuses in a thickness direction of the material, and breaks the oxide films on the surfaces of both the brazing material and the material to be brazed, thereby promoting the wetting between the brazing material and the material to be brazed.

The brazing conditions are not particularly limited. For example, the heat exchanger assembly 101 may be heated to a brazing temperature (actual reaching temperature) of 580° C. to 620° C. at a rate of temperature increase of 5° C./min or greater in a nitrogen atmosphere set in the furnace, held for 30 seconds or longer at the brazing temperature, and cooled from the brazing temperature to 400° C. at a cooling rate of 10° C./min or greater.

In brazing, a part of the aluminum alloy matrix forming the tube 3 and the fin 4 reacts with the composition of the brazing coating film 7 applied to the tube 3, turns into a brazing filler metal (any of an Al—Zn brazing filler metal, an Al—Si brazing filler metal, an Al—Si—Zn brazing filler metal, and the like), and spreads, and the tube 3 and the fin 4 are brazed. The surface of the tube 3 becomes baser than the inside of the tube 3 due to Zn in the flux diffusing thereon by brazing, and a sacrificial anode layer is formed. Furthermore, Zn also diffuses on the surfaces of the header pipes 1 and 2 to form a sacrificial anode layer.

According to this embodiment, brazing is satisfactorily carried out without residues of the Si powder, and thus the fillet 9 is securely formed between the tube 3 and the fin 4, and also less likely to corrode.

In the obtained heat exchanger 100, a sacrificial anode layer containing an appropriate amount of Zn is formed on the surface of the tube 3. Accordingly, pitting corrosion is prevented, the tube 3 and the fin 4 are securely joined for a long period of time, and thus good heat exchange performance is maintained. That is, it is possible to provide a heat exchanger 100 in which since pitting corrosion does not easily occur in the tube 3, the tube 3 itself has excellent corrosion resistance, and the fins 4 are not easily detached due to good brazability.

EXAMPLES

An Al alloy having a composition of Si: 1.0% and Mn: 1.0% with the balance Al and inevitable impurities by mass % was subjected to a homogenization heat treatment, and then hot extruded to produce a tube (thickness t: 0.3 mm×width W: 18 mm×total thickness T: 1.3 mm, a 19-hole extruded MPE tube).

An Al alloy for a fin having a composition of Si: 1.0%, Mn: 1.5%, Fe: 0.2%, Zn: 1.5% with the balance Al and inevitable impurities by mass % was subjected to a homogenization heat treatment, and then subjected to hot rolling and cold rolling to obtain an Al alloy sheet having a thickness of 0.08 mm. Fins were produced by corrugating the Al alloy sheet.

Next, a mixed composition coating material for brazing was applied to a front surface and a back surface of the extruded porous tube by rolling, and dried at 150° C. for 3 minutes to form a brazing coating film.

The mixed composition coating material for brazing is a coating material containing a Si powder (D(99) particle size 15 μm: D(99) is a diameter in which the volume-based cumulative particle size distribution from the smaller particle size side is 99%) or an Al—Si powder, a Zn-containing flux powder (KZnF$_3$), a binder (any of an acrylic resin, a resin having a polyether skeleton, and a cellulose resin), a solvent (any of formic acid, isopropyl alcohol (IPA), dibutyl phthalate (DBP), 3-methoxy-3-methyl-1-butanol (MMB), ethyl acetate, and phenol), and water. As the mixed composition coating material for brazing, those having a composition ratio in Table 1 were used.

Regarding each mixed composition coating material for brazing having a composition shown in Table 1, a viscosity immediately after the production of the coating material (B-type viscometer, rotation speed 60 rpm, measured value after 5 minutes) and a viscosity (B-type viscometer, rotation speed 60 rpm, measured value after 5 minutes) after leaving in the air for 24 hours were measured, and a difference therebetween was measured as a viscosity change.

In addition, a coating material was manufactured as a mixed composition coating material for brazing, and used and applied after 24 hours to the previous extruded porous tube such that the amount of the coating material applied was 10 g/m². In this manner, a brazing coating film was formed.

Regarding coatability in the formation of the coating film, in a case where the difference in viscosity between the coating material immediately after the production and the coating material after 24 hours passes was less than ±30 (mPa·s), the viscosity change was judged to be small and the coatability was judged to be excellent.

Next, the tube and the fin described above were assembled as a part of a heat exchanger assembly as shown in FIG. 3, and this assembly was heated to 600° C. in a heating furnace, held for 2 minutes, and then cooled for brazing. All of the brazing operations were performed in the furnace with a nitrogen gas atmosphere.

Brazability evaluation was performed by observing the heat exchanger assembly after brazing and visually observing the reactivity of the coating film. An example in which the coating film reacted completely and fillets were formed in the joining portions was judged to be acceptable (A), and an example in which there was even one unreacted portion in the coating film was judged to be unacceptable (B).

The results are shown in the following Table 1.

TABLE 1

| | Coating Material | | | | | | | | |
|---|---|---|---|---|---|---|---|---|---|
| | Solid Material (30 to 80 mass %) | | | Dispersion Medium (20 to 70 mass %) | | | | | |
| | Kind and Content of Brazing Material (mass %) | Kind and Content of Flux (mass %) | Kind and Content of Binder (mass %) | Kind and Content of Organic Solvent (mass %) | Water Content (mass %) | SP Value of Organic Solvent | Viscosity Change (mPa · s) | Coatability | Brazability |
| Example 1 | Si Powder: (15) | KZnF3: (30) | Acrylic Resin: (5) | Formic Acid: (47.5) | 2.5 | 14 | −10 | A | A |
| Example 2 | Si Powder: (15) | KZnF3: (30) | Acrylic Resin: (5) | IPA: (49.0) | 1 | 11.5 | −10 | A | A |
| Example 3 | Si Powder: (15) | KZnF3: (30) | Acrylic Resin: (5) | DBP: (49.6) | 0.4 | 9.4 | −29 | A | A |
| Example 4 | Si Powder: (22) | KZnF3: (50) | Acrylic Resin: (5) | IPA: (19.6) | 0.4 | 11.5 | −10 | A | A |
| Example 5 | Si Powder: (8) | KZnF3: (17) | Acrylic Resin: (5) | IPA: (69.6) | 0.4 | 11.5 | −25 | A | A |
| Example 6 | Si Powder: (1.5) | KZnF3: (43.5) | Acrylic Resin: (5) | IPA: (49.0) | 1 | 11.5 | −10 | A | A |
| Example 7 | Si Powder: (73) | KZnF3: (2.5) | Acrylic Resin: (4.5) | IPA: (19.6) | 0.4 | 11.5 | −10 | A | A |
| Example 8 | Si Powder: (42.5) | KZnF3: (2.5) | Acrylic Resin: (5) | IPA: (49.0) | 1 | 11.5 | −10 | A | A |
| Example 9 | Si Powder: (1.5) | KZnF3: (74) | Acrylic Resin: (4.5) | IPA: (19.6) | 0.4 | 11.5 | −10 | A | A |
| Example 10 | Si Powder: (15) | KZnF3: (30.5) | Acrylic Resin: (4.5) | IPA: (49.0) | 1 | 11.5 | −10 | A | A |
| Example 11 | Si Powder: (20) | KZnF3: (45.5) | Acrylic Resin: (14.5) | IPA: (19.6) | 0.4 | 11.5 | −10 | A | A |
| Example 12 | AlSi Powder: (15) | KZnF3: (30) | Acrylic Resin: (5) | MMB: (49.0) | 1 | 9.8 | −10 | A | A |
| Example 13 | AlSi Powder: (15) | KZnF3: (30) | Resin Having Polyether Skeleton: (5) | MMB: (49.0) | 1 | 9.8 | −10 | A | A |
| Example 14 | AlSi Powder: (15) | KZnF3: (30) | Cellulose-Based Resin: (5) | MMB: (49.0) | 1 | 9.8 | −10 | A | A |

TABLE 1-continued

| | Coating Material | | | | | | | | |
|---|---|---|---|---|---|---|---|---|---|
| | Solid Material (30 to 80 mass %) | | | Dispersion Medium (20 to 70 mass %) | | | | | |
| | Kind and Content of Brazing Material (mass %) | Kind and Content of Flux (mass %) | Kind and Content of Binder (mass %) | Kind and Content of Organic Solvent (mass %) | Water Content (mass %) | SP Value of Organic Solvent | Viscosity Change (mPa · s) | Coatability | Brazability |
| Comparative Example 1 | Si Powder: (15) | KZnF3: (30) | Acrylic Resin: (5) | MMB: (50.0) | 0 | 9.8 | −55 | B | B |
| Comparative Example 2 | Si Powder: (15) | KZnF3: (30) | Acrylic Resin: (5) | MMB: (49.7) | 0.3 | 9.8 | −35 | B | B |
| Comparative Example 3 | Si Powder: (15) | KZnF3: (30) | Acrylic Resin: (5) | MMB: (47.4) | 2.6 | 9.8 | 30 | A | B |
| Comparative Example 4 | Si Powder: (15) | KZnF3: (30) | Acrylic Resin: (5) | Ethyl Acetate: (49.0) | 1 | 9 | 105 | B | B |
| Comparative Example 5 | Si Powder: (15) | KZnF3: (30) | Acrylic Resin: (5) | Phenol: (49.0) | 1 | 14.5 | −10 | A | B |
| Comparative Example 6 | Si Powder: (1.4) | KZnF3: (43.5) | Acrylic Resin: (5) | MMB(49.1) | 1 | 9.8 | −10 | A | B |
| Comparative Example 7 | Si Powder: (74) | KZnF3: (2.5) | Acrylic Resin: (4.5) | MMB(18.6) | 0.4 | 9.8 | −10 | A | B |
| Comparative Example 8 | Si Powder: (42.5) | KZnF3: (2.4) | Acrylic Resin: (5) | MMB: (49.1) | 1 | 9.8 | −10 | A | B |
| Comparative Example 9 | Si Powder: (1.5) | KZnF3: (75) | Acrylic Resin: (4.5) | IPA: (18.6) | 0.4 | 11.5 | −10 | A | B |
| Comparative Example 10 | Si Powder: (15) | KZnF3: (30.5) | Acrylic Resin: (4.0) | MMB: (49.5) | 1 | 9.8 | −10 | A | B |
| Comparative Example 11 | Si Powder: (20) | KZnF3: (45) | Acrylic Resin: (15.0) | MMB: (19.6) | 0.4 | 9.8 | −10 | A | B |

Each of the samples of Examples 1 to 14 shown in Table 1 is a sample formed of a coating material in which solid material are contained in an amount of 30 mass % or greater and 80 mass % or less, an organic solvent including water is contained in an amount of 20 mass % or greater and 70 mass % or less, and water is contained in an amount of 0.4 mass % or greater and 2.5 mass % or less with respect to a total mass of the solid material, the organic solvent, and the water.

The samples of the examples had a viscosity change of 30 (mPa·s) or less, and had excellent coatability and brazability.

The sample of Comparative Example 1 contained no water although containing a solid material and an organic solvent in desirable ranges. Accordingly, the sample had a large viscosity change. Therefore, the sample was poor in both coatability and brazability.

In the sample of Comparative Example 2, the water content was less than a desirable range, and the sample was poor in both coatability and brazability. The sample of Comparative Example 3 had a too high water content. The sample had a large viscosity change, and was thus poor in brazability.

In the sample of Comparative Example 4, an SP value of the organic solvent was small. The viscosity change significantly increased, and the sample was poor in both coatability and brazability. In the sample of Comparative Example 5, an SP value of the organic solvent was large, and the sample had a problem in brazability.

Since the sample of Comparative Example 6 had a low brazing material content, the sample had a problem in brazability.

In the sample of Comparative Example 7, the amount of the brazing material was large, and the amount of the organic solvent was small. The sample had a problem in brazability.

In the sample of Comparative Example 8, the amount of the flux was small. The sample had a problem in brazability.

In the sample of Comparative Example 9, the amount of the flux was large, and the amount of the organic solvent was small. The sample had a problem in brazability.

In the sample of Comparative Example 10, the amount of the binder was small. The sample had a problem in brazability.

In the sample of Comparative Example 11, the amount of the binder was large. The sample had a problem in brazability.

INDUSTRIAL APPLICABILITY

It is possible to improve the reliability of brazing while reducing a burden in brazing between a heat transfer tube and a fin.

REFERENCE SIGNS LIST

100: heat exchanger
1, 2: header pipe
3: MPE tube (tube)
3A: upper surface
3B: lower surface
3C: passage
4: fin
6: slit
7: brazing coating film
8, 9: fillet
11: core material
12: coating layer

The invention claimed is:
1. A mixed composition coating material, consisting of:
from 30 mass % to 80 mass % of a solid material;
from 20 mass % to 70 mass % of an organic solvent; and
from 0.4 mass % to 2.5 mass % of water, wherein, a total mass of the solid material, the organic solvent, and the water is defined as 100 mass %, and wherein the solid material consists of a brazing material, a flux, and a synthetic resin, the brazing material is contained in a range of 1.5 to 73 mass %, the flux is contained in a range of 2.5 to 74 mass %, and the synthetic resin is contained in a range of 4.5 to 14.5 mass %.

2. The mixed composition coating material according to claim 1, wherein the flux is a fluoride-based flux.

3. The mixed composition coating material according to claim 2, wherein the fluoride-based flux consists of one or more of $KZnF_3$, $ZnF_2$, LiF, KF, $CaF_2$, $AlF_3$, $K_2SiF_6$, $KAlF_4$, $K_3AlF_6$, and $K_2AlF_5$, $5H_2O$.

4. The mixed composition coating material according to claim 1, wherein the brazing material comprises a Si powder or a Si-containing alloy powder.

5. The mixed composition coating material according to claim 1, wherein the synthetic resin consists of one or more of an acrylic resin, a resin having a polyether skeleton, and a cellulose-based resin.

6. The mixed composition coating material according to claim 1, Wherein the organic solvent comprises one or more of isopropyl alcohol (IPA), 3-methoxy-3-methyl-1-butanol (MMB), a formic acid, dibutyl phthalate (DBP)ethyl acetate, and phenol.

7. The mixed composition coating material according to claim 1, wherein the flux comprises Zn.

8. The mixed composition coating material according to claim 7, Wherein the flux comprises at least one of $KZnF_3$ and $ZnF_3$.

* * * * *